United States Patent [19]

Schmidt et al.

[11] Patent Number: 6,006,229
[45] Date of Patent: Dec. 21, 1999

[54] XBASE TRANSACTION PROCESSING SYSTEM

[75] Inventors: Bradley E. Schmidt; Robert C. Lokken, both of Boise, Id.

[73] Assignee: Extended Systems, Inc., Boise, Id.

[21] Appl. No.: 08/699,380

[22] Filed: Aug. 19, 1996

[51] Int. Cl.⁶ ..................................................... G06F 17/30
[52] U.S. Cl. ................................. 707/10; 707/2; 707/104
[58] Field of Search ................................... 707/1, 2, 104, 707/10, 203

[56] References Cited

U.S. PATENT DOCUMENTS

| | | | |
|---|---|---|---|
| 5,388,256 | 2/1995 | Herbert | 707/8 |
| 5,608,874 | 3/1997 | Ogawa et al. | 395/200.15 |
| 5,680,618 | 10/1997 | Freund | 707/200 |
| 5,682,525 | 10/1997 | Bouve et al. | 707/104 |

OTHER PUBLICATIONS

Kruglinski, David J., "Inside Visual C++ (Second Edition)", Chapter 24, pp. 501–506 (Microsoft Press 1994).

"Advantage 3.0 Reference for Advantage Databae Server" (Extended Systems Inc. 1993).

Marasca, Brian, "ObjectDB: A Class Library for Database Management" (Micran Associates 1993).

Day, Michael, "NetWare 4.0 NLM Programming" pp. 221–227 (Novel Press 1993).

"CA–Clipper Reference Guide for DOS", pp. 2–172–2–173 (Computer Associates 1992).

"CA–Clipper Drivers Guide version 5.2" pp. 2–2–2–10 (Computer Associates 1992).

*Primary Examiner*—Thomas G. Black
*Assistant Examiner*—Charles L. Rones
*Attorney, Agent, or Firm*—Robert A. Huntsman

[57] ABSTRACT

An Xbase transaction processing system that allows Xbase and SQL clients to operate against an Xbase file set on a server computer with commit/rollback transaction behavior that protects the data integrity of the Xbase file set against corruption due to the failure of one or more client computers. The system includes a server network communication means, an Xbase transaction protocol interpreter, an Xbase transaction management means, and an Xbase data file execution means. The communication means is configured to receive Xbase transactional commands from the network and to present server responses to the network. Software interfaces attach the network communication means to the protocol interpreter, the protocol interpreter to the transaction manager and the transaction manager to the file execution means.

8 Claims, 11 Drawing Sheets

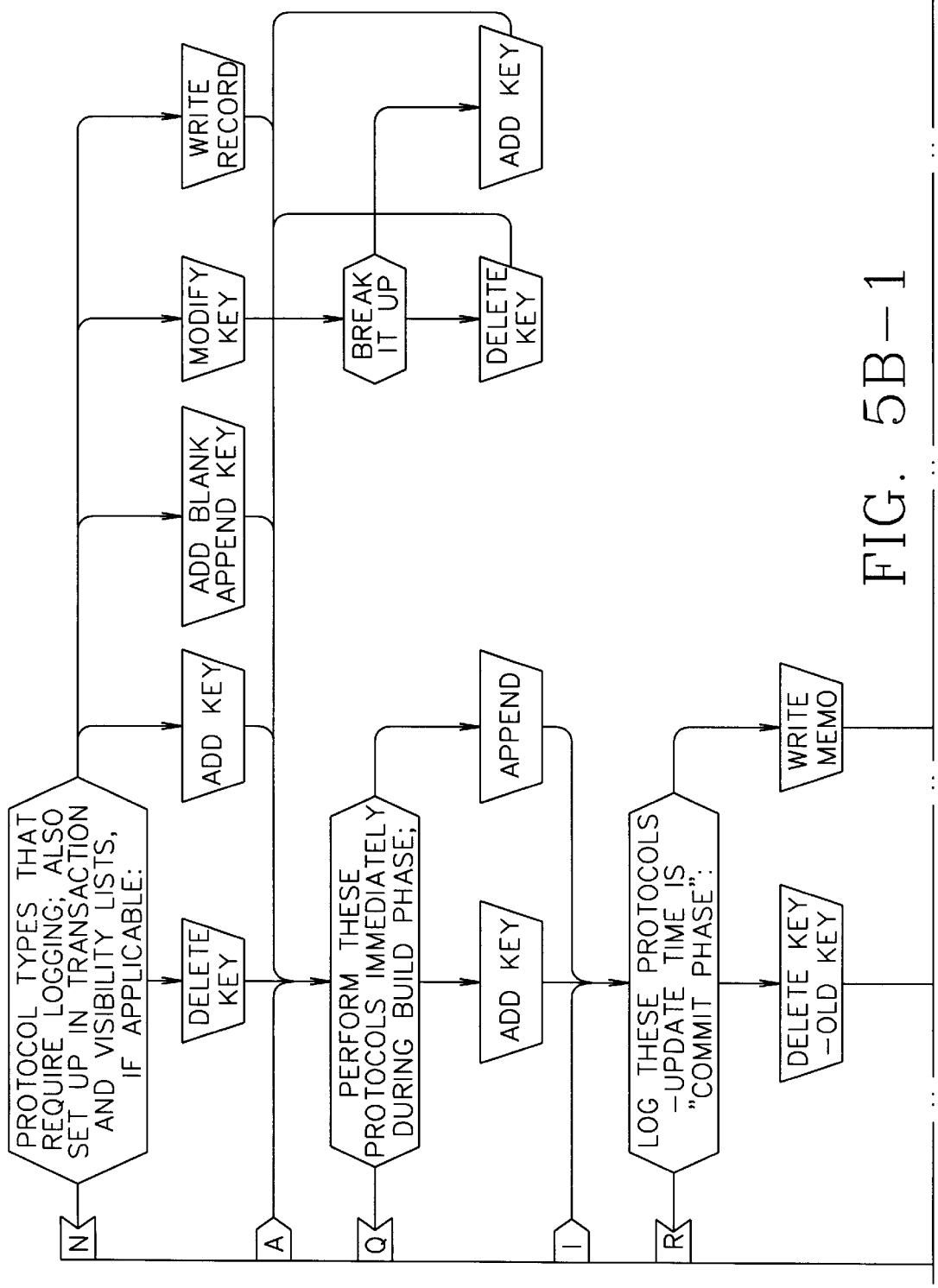

XBASE TRANSACTION PROCESSING SYSTEM

REFERENCES

[1] Melton, Jim (ed.), "Database Language SQL", ANSI X3H2 (1986)
[2] House, Bill (ed.), "Xbase Programming Language (Preliminary Draft)", ANSI X3J9 (1993)
[3] Kruglinski, David J., "Inside Visual C++ (Second Edition)", p. 503–506 (Microsoft Press 1994)
[4] Advantage 3.0 Reference for Advantage Xbase Server (Extended Systems Inc. 1993).
[5] Marasca, Brian, "ObjectDB: A Class Library for Database Management", Micran Associates 1993). ObjectDb is a trademark of Micran Associates.
[6] Day, Michael, "NetWare 4.0 NLM Programming" (Novell Press 1993)
[7,8]Rose, Charles G, "Programmeer's Guide to NetWare", Chapter 14 (McGraw-Hill 1990)
[9] CA-Clipper Reference Guide for Dos (Computer Associates 1992)
[10] CA-Clipper Drivers Guide Version 5.2 (Computer Associates 1992). Clipper is a registered trademark of Computer Associates.
[11] Kruglinski, David J., "Inside Visual C++ (Second Edition)", chapter 24, p.501–548 (Microsoft Press 1994)
[12] Simba Engine 3.1 for Microsoft Windows (Simba Technologies Inc. 1995). Simba is a trademark of Simba Technologies

TECHNICAL FIELD

The present invention relates to computer transaction processing systems and more particularly to computer transaction processing systems based on the Xbase programming language.

BACKGROUND OF THE INVENTION

Computer database servers are computers with centralized database storage arranged so that a number of users at remote client computers can simultaneously access the data in the database. The database server contains the necessary logic to ensure that the data does not become corrupted when two or more clients write to the database at the same time. One possible source of data corruption on a database server arises when two or more client users attempt to change the same set of data simultaneously. Without some sort of control mechanism, such access can easily corrupt the data.

Most database servers are based on database languages such as SQL. SQL was originally defined as a U.S. national standard by ANSI X3H2 in 1986[1]. Since that time, a number of revisions of standardized SQL have emerged. In addition, a large number of vendors have released database products based on standardized SQL or some variant of that language.

Database languages generally differ from traditional computer programming languages in that database languages provide language constructs to describe and manipulate data. Traditional programming language are typically much broader in scope and provide language constructs to display user data on a client screen and receive input from a keyboard, mouse, or other input device and in general manage the user interface. In addition, traditional computer programming languages contain language constructs to read and write data into storage devices such as computer file systems, tape drives, CD-ROM drives, and so forth.

Examples of traditional programming languages include FORTRAN, BASIC, C, C++, FORTH, PASCAL, LISP, ADA, MODULA II, and assembly language for a large number of different computer systems. Database languages such as SQL, on the other hand, limit their language constructs to data definition, creation and manipulation, and specifically avoid providing constructs for user interface programming.

When personal computers were introduced in the late 1970's and early 1980's, a family of programming languages was introduced that contained the features of traditional programming languages such as C, FORTRAN, BASIC and PASCAL to manage user interfaces. These programming languages also included language constructs to provide database-like creation and manipulation commands based on computer files of the underlying operating system. Ashton Tate's dBASE is an early example of such a hybrid language. dBASE is a registered trademark of Borland International, a successor to Ashton-Tate. dBASE evolved into a generalized language known generically as Xbase. Xbase has been the subject of an ANSI standardization effort under the direction of ANSI X3J9 [2]. It is instructive to note that ANSI classifies SQL as a database language, contrasted with Xbase which is classified a programming language.

Computer languages and programming environments based on Xbase and its derivatives have proven very popular and are well suited for single computer applications as shown in FIG. 1. In such a system, an Xbase application program 1 is compiled against a traditional Xbase language environment 3 such as Clipper or dBASE. The resulting program is executed on the single personal computer 9, making changes to the Xbase file set 5 of the underlying DOS file system 7. Single computer environments avoid the problems introduced when multiple users are demanding simultaneous access to a common set of data.

However, it is a widely held belief that Xbase is inherently different from a database and is not suitable for true, mission-critical database processing for corporate data. Microsoft, a major computer software supplier, provides both Xbase products and SQL products, and instructs its customers that Xbase is suitable for local file manipulation, but that SQL should be used for remote database access.[3] Database experts have long held that Xbase is not a database language and should not be used for multi-user database applications. SQL is often described as a query language, while Xbase has a large number of non-query language constructs.

There are major architectural differences between Xbase and SQL. Xbase is based on known file formats, typically the so-called .DBF file format, and number of related index file formats. Xbase applications know and directly manage data files and associated index files. In SQL, the underlying file system and indexes are hidden from the application program which instead references logical database tables rather than physical operating system files. This distinction requires entirely different programming models for application programs.

Xbase and SQL differences are troublesome for information clients who desire to scan information that spans both Xbase data file sets and SQL databases. With the explosion of computer networking in general, and the internet in particular, information clients need to access data where it is found and in its native format. This is a different paradigm from a few years ago when it was customary to copy data sets of interest into the native format for a particular SQL system. Microsoft and other software vendors have addressed the need to span SQL and Xbase data by a single application by providing an programming language interface called ODBC [11] which allows an application program to access both Xbase data and SQL data from a single application program. Microsoft Access is an example of an ODBC product that supports ODBC. ODBC and related technologies provide a programming environment where differences between Xbase data file set programming and SQL database programming are minimized, but not entirely eliminated. One difference not eliminated by ODBC and related technologies is differences in transaction behavior for Xbase and SQL. ODBC supports transaction technologies only if the underlying system—SQL or Xbase—supports it. This means for traditional Xbase, there is no true transaction support.

With the introduction of computer networks for personal computers, the concept of a file server was deployed in which multiple clients can access generic computer files on a centralized server. Such a server protects multiple users from corrupting computer files. Traditional Xbase, running on a file server, is shown in FIG. 2. In FIG. 2, there are least three computers denoted by 25, 25' and 18. 25 and 25' denote client computers operating against file server computer 18. Note that although only two clients are shown, there can be an arbitrarily large number of clients. In FIG. 2, Xbase application programs 1 and 1' are compiled or interpreted by their respective traditional Xbase language environment 3 or 3' which translates Xbase commands into file system calls against the DOS file system API 11 and 11'. Transparent to application 1 and 1' the DOS file system API function calls 11 are converted into file system commands for the file system 17. The commands are delivered to the server computer via the network drivers 13, 13' and 15. In this system, the Xbase application programs 1 and 1' can run simultaneously, and the file system 17 will protect individual files in the Xbase file set 5 from corruption. However, a file server 18 cannot protect database corruption. Database corruption can occur even though the underlying files in the Xbase file set 5 that contain the database data are not individually corrupted. Database corruption is intolerable in a serious business application for obvious reasons.

To understand how a data files using the system of FIG. 2 can be corrupted even when the underlying files are individually not corrupted, the concept of a data transaction is helpful. By way of a highly simplified illustration, suppose a bank customer request that $10,000 be transferred from a savings account to a checking account. Suppose, further, that the bank maintains the checking account information in file C on its file system and its savings account information on file S. In order to complete the transfer, the following steps must take place:

Step 1: Add $10,000 to the proper account in file C.
Step 2: Subtract $10,000 from the proper account in file S.

Now suppose that when this banking transfer is being made, the computer system successful completes step 1, but before step 2 initiates, the computer system goes down for some reason. In this situation, both files C and S, as files, are not corrupted (i.e. both files contain meaningful data). However, the system as a whole is corrupted, because the customer now has a windfall gain of $10,000 and the banks data set is corrupted because it shows $10,000 more in its accounts than it actually has. Neither file C or S, standing alone, is corrupted; each is correct depending on whether the transfer is considered completed or not. As a set, however, the files are corrupted. Thus in such a situation, the database is corrupted, even though the underlying files are not. In database terminology, the database integrity is violated, even though file system integrity is preserved. Switching the order of steps does not solve the database corruption problem; it just changes the details of the corruption.

To address the form of database corruption illustrated by the simple banking illustration, the concept of a transaction has been introduced and has been widely known for many years. Transactions are an inherent feature of database languages such as SQL. In a transaction based system, steps 1 and 2 are combined by the application program into a single unit of work called a transaction. A simple rule but fundamental rule of transaction processing says that all steps of a transaction must be completed or none of the steps of the transaction must be completed. If a transaction is fully completed and reflected in the database, the transaction is said to be "committed". If the transaction does not complete, and any partially completed steps are reversed, the transaction is said to be "rolled back." Thus in our banking example, when the computer systems failed after completing step 1 but not step 2, at some point the computer system is restored to an operational state and partially finished transaction must either be committed or rolled back; generally the latter. Thus if transaction processing is in place, after such a failure, a rollback would be issued either by the administrator or automatically. The rollback would effectively undo step 1 by subtracting the $10,000 from account C, and the entire transaction could be reissued to complete the requested transfer.

Transaction processing is considered to be one of the most important distinctions that separates traditional programming languages from database languages. Transactions are well-defined in SQL but are not well defined in traditional Xbase. Xbase critics have long maintained that proper transaction semantics cannot be implemented in Xbase.

Xbase database servers such as the Advantage I database server have been introduced.[4] These database servers reside on the server computer and add performance benefits to file servers used in an Xbase environment. Unfortunately servers such as the Advantage I do not offer a solution to the database corruption described earlier.

Other products, such as ObjectDB[5] attempt to add commit/rollback transactional processing to a multi-user programming environment by including transactional logic on each client as shown in FIG. 3. FIG. 3 is similar to FIG. 2 except client transaction management means 19 is added. Also, the Xbase language environment 21 is enhanced over the traditional Xbase language environment 3 in that the Xbase language environment 21 provides a mechanism to define transactions by providing transactional programming commands to the user environment such as BEGIN TRANSACTION and COMMIT TRANSACTION and ROLLBACK TRANSACTION. With the Xbase language environment 21, programmers can explicitly identify transactions in the Xbase application program 1.

Although the client-based transaction management 19 and 19' illustrated in FIG. 3 appears to add transactional processing to Xbase, it suffers from a number of problems. Since there is no central point of control in the system illustrated in FIG. 3, each client 25 and 25' may modify any file in the Xbase file set 5 at will on the server 18, potentially corrupting the Xbase file set 5. If any one client 25 or 25' fails, then part or all of the transaction management is subject to failure, leading to database corruption. This problem is particularly acute in a modern PC based network, where client computers 25 and 25' are often powered down or reset by their users. Such users are often unaware that such action is corrupting the Xbase file set. In other words, a user who simply turns his or her desktop off at night before going home from work can inadvertently corrupt the Xbase file set 5 when using the client transaction management means 19 and 19' of FIG. 3. In such as system there is no central authority to detect the failure and "clean-up" any unfinished work. When a catastrophic failure of a client 25 or 25' occurs—i.e. the client machine is turned off without exiting an application program—each application that was in the process of updating the database when the failure occurred must be identified, and instructed to "clean up" the failed database. In the client-based transaction management system of FIG. 3, since each remaining client 25 and 25' generally has no knowledge of what other clients 25 and 25' were doing or that they even existed, it is difficult or impossible for a surviving client 25 or 25' to clean up after a failed peer client 25 or 25.

Furthermore, even if the failed client is eventually restored and determines that a failure occured, under the client-base transaction management approach of FIG. 3, since record locks are generally removed when a client fails, there is no mechanism to stop another client from writing to the records involved in the partially finished but failed transaction before the failed client gets a chance to undue the partial transaction. Furthermore, any client 25 or 25' that fails to behave properly either due to a unintentional programming bug, or an operator error or a power down can easily corrupt the Xbase file set 5.

What is needed is an Xbase programming environment that properly implements transaction management and prevents Xbase file corruption due to either client errors or other client failures.

SUMMARY OF THE PRESENT INVENTION

The present invention is illustrated generally in FIG. 4. It provides for a new Xbase transaction management means 31 that resides on the server 18, providing a client-independent, centralized point of control for file modifications. The present invention prevents corruption of an Xbase database reflected in an Xbase file set 5 by implementing commit/rollback transaction processing against the Xbase file set 5 even when a client 25 or 25' fails unexpectedly. The present invention prevents a new client from writing on data partially updated by a failed transaction. The present invention for the first time provides a means for multiple SQL client application programs to execute against an Xbase file set with proper commit/rollback behavior. The present invention also provides for the first time the ability for multiple SQL based application programs and/or Xbase based application programs to simultaneously execute against an underlying Xbase data set and maintain proper transaction behavior for both the SQL clients and the Xbase client.

The present invention preserves the integrity of the Xbase database reflected in the Xbase file set 5 without the help or cooperation of the clients 25 or 25'.

DETAILED DESCRIPTION OF THE INVENTION

The above reference list contains background information from public sources that is helpful, although not absolutely essential, to understand this invention, and is hereby incorporated by reference.

Figure 1:
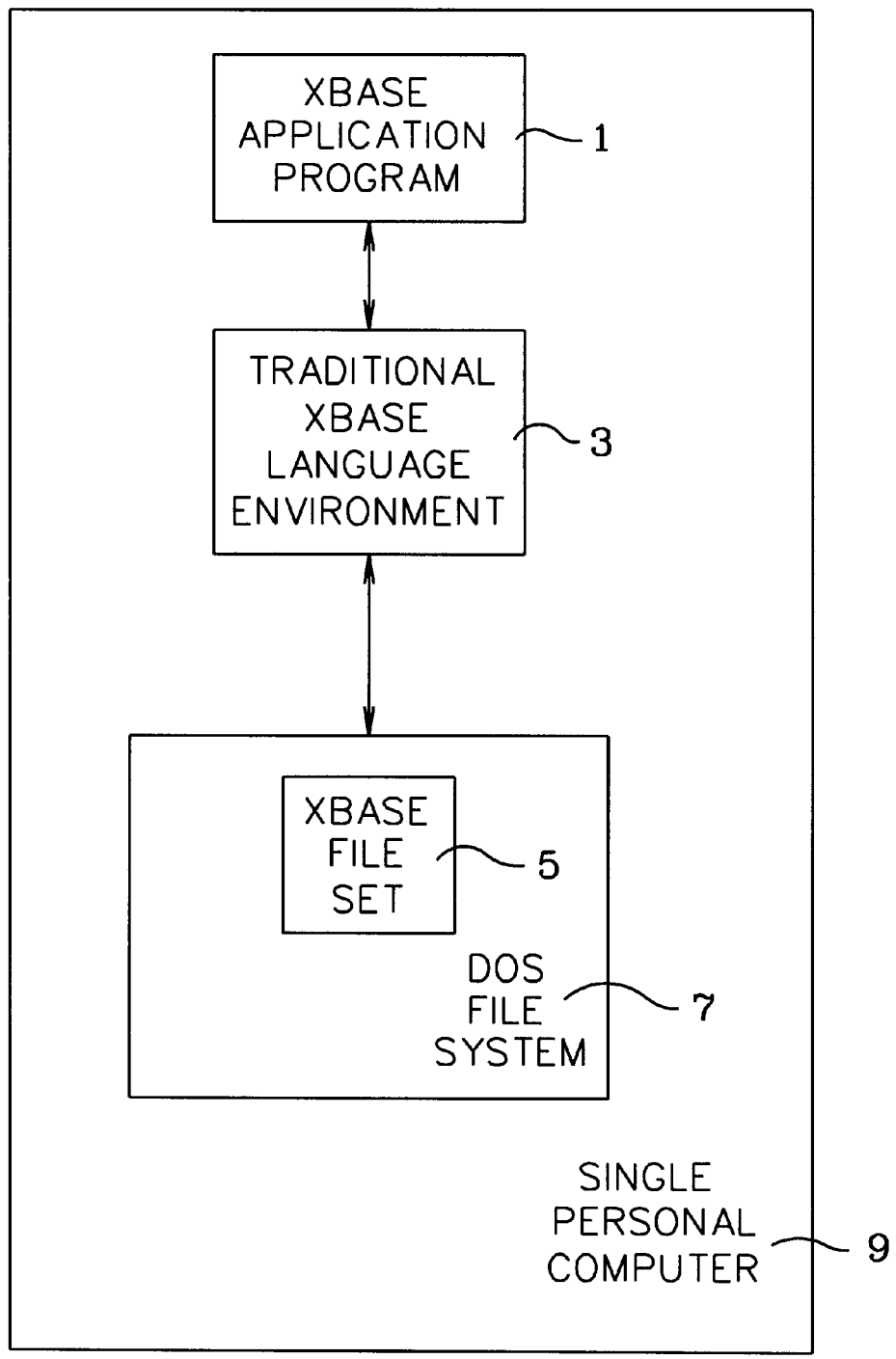
FIG. 1 is a block diagram of a traditional Xbase single user system according to the prior art.
Figure 2:
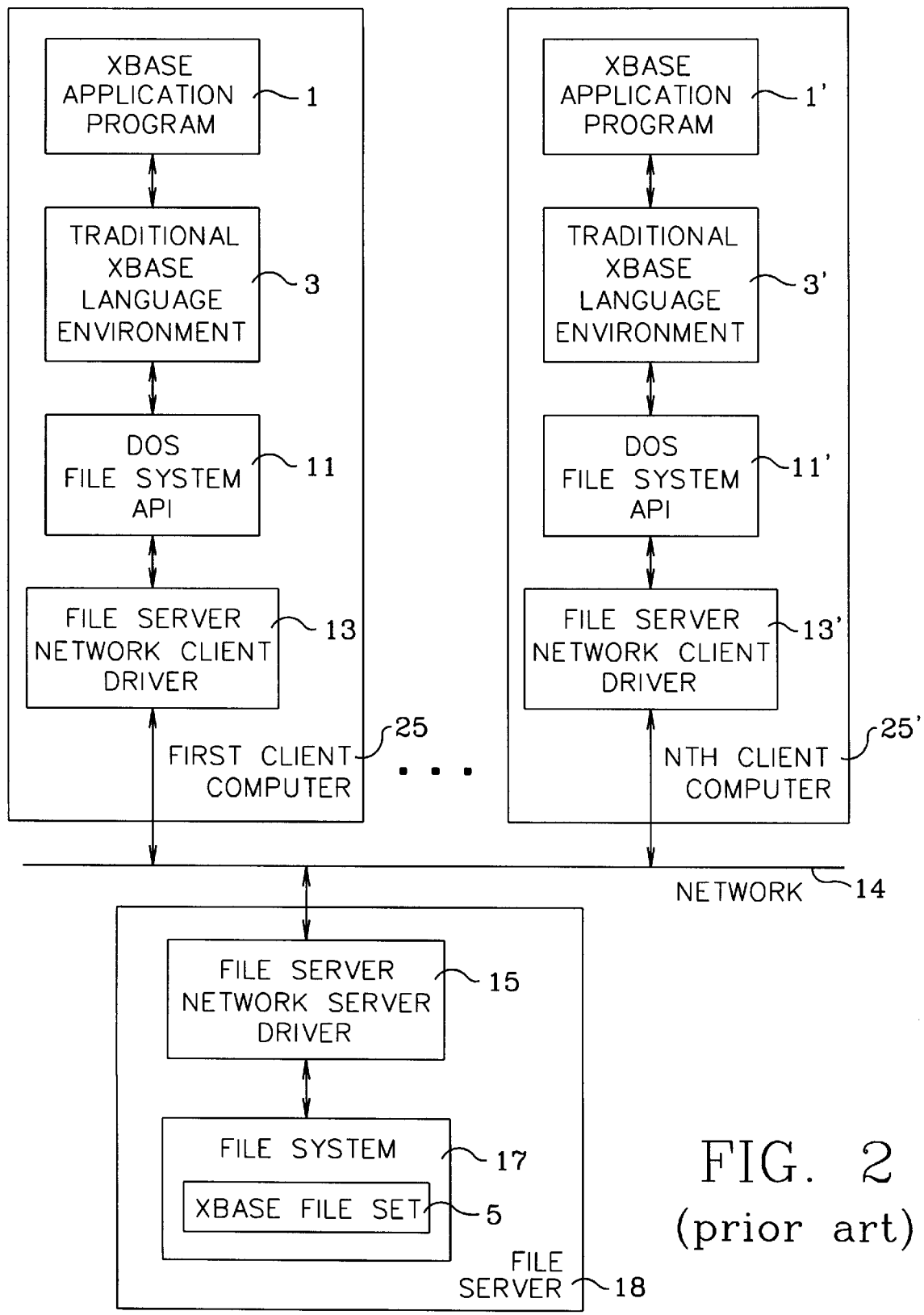
FIG. 2 is a block diagram of a traditional Xbase single user system deployed on a multi-user file server according to the prior art.
Figure 3:
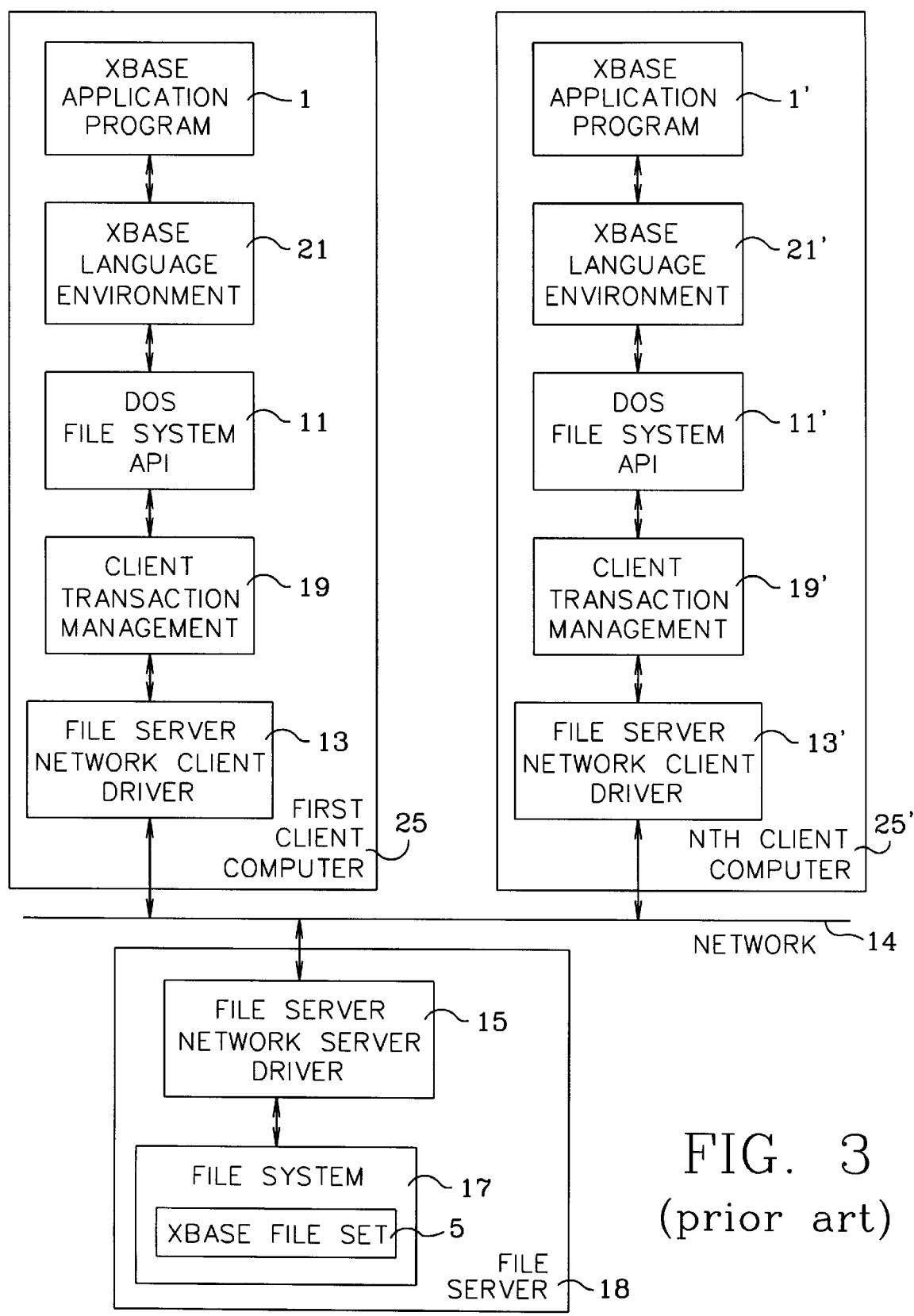
FIG. 3 is a block diagram of an Xbase multi-user system with client-side transaction management according to the prior art.
Figure 4:
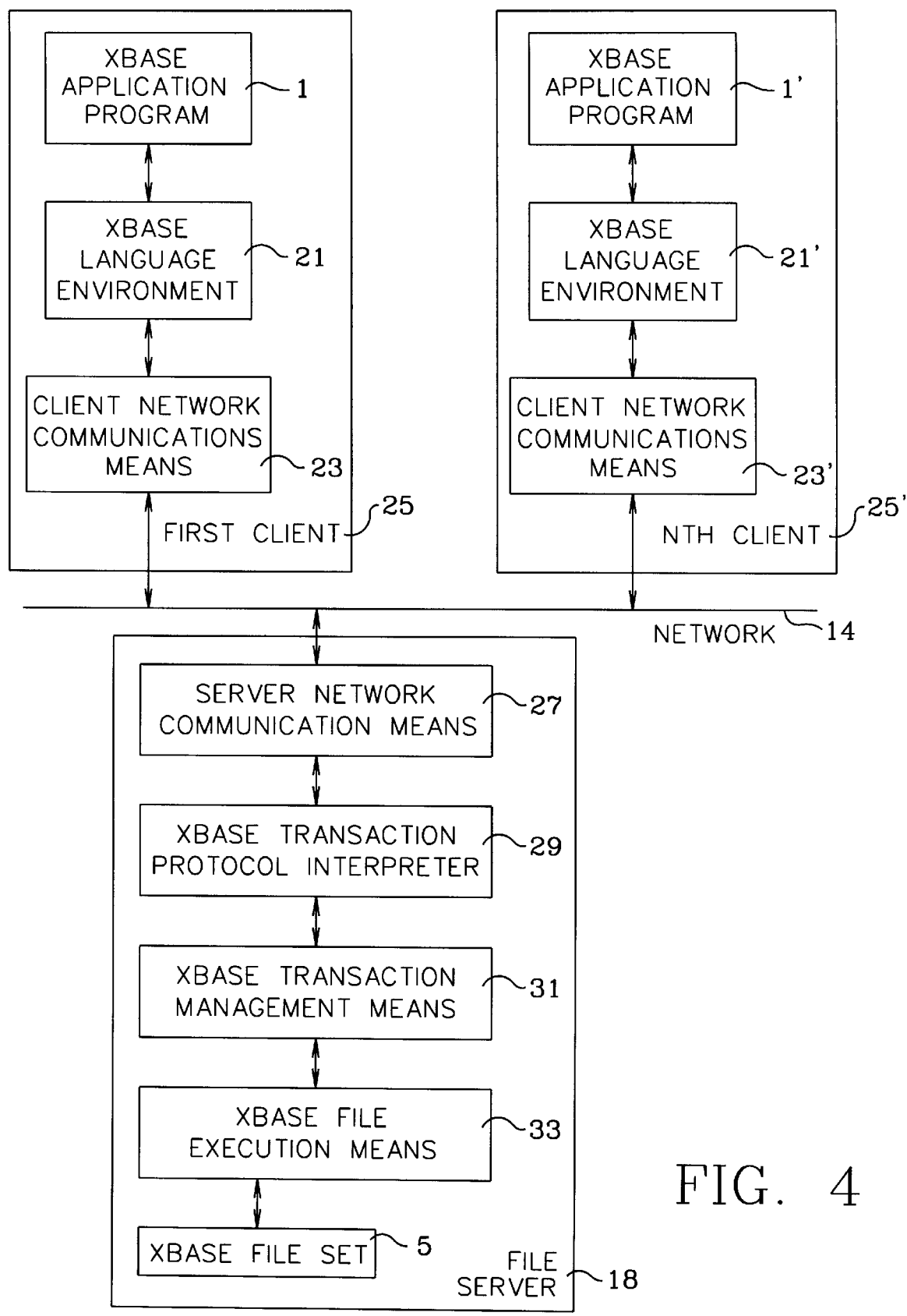
FIG. 4 is a block diagram of an Xbase transaction processing system according to the present invention.

FIG. 4 shows the general block diagram of the present invention. The preferred embodiment is based on the Clipper programming language[9]. Clipper is a well-known variant of Xbase.

In the preferred embodiment, the transaction elements on the server 18—the server network communication means 27, the Xbase transaction protocol interpreter 29, and the Xbase transaction management means 31—are implemented on a Novell NetWare file server within a single NetWare Loadable Module (NLM). The details of how to implement an NLM are well known to one skilled in the art and are described in [6].

The server network communication means 27 can be any modern computer networking protocol. In the preferred embodiment, the network communication means consists of a transport protocol that operates over a network protocol. This embodiment uses IPX [7], a well known network protocol, for its network protocol. SPX [8], a well known transport protocol, can be used as the transport protocol, but for performance reasons, the preferred embodiment uses a custom transport protocol written for the Xbase database server similar to SPX. SPX requires an acknowledgment from the receiver to the sender for every packet to verify the packet was received intact. The custom transport protocol for this embodiment is similar to SPX, but it avoids sending an acknowledgment each packet, instead relying on the fact that most Xbase server commands are initiated by the client and expect a response. Since for Xbase, the packet based acknowledgement provided by SPX is redundant and time consuming, the transport protocol eliminates the redundant acknowledgment.

Figures 1, 5A:
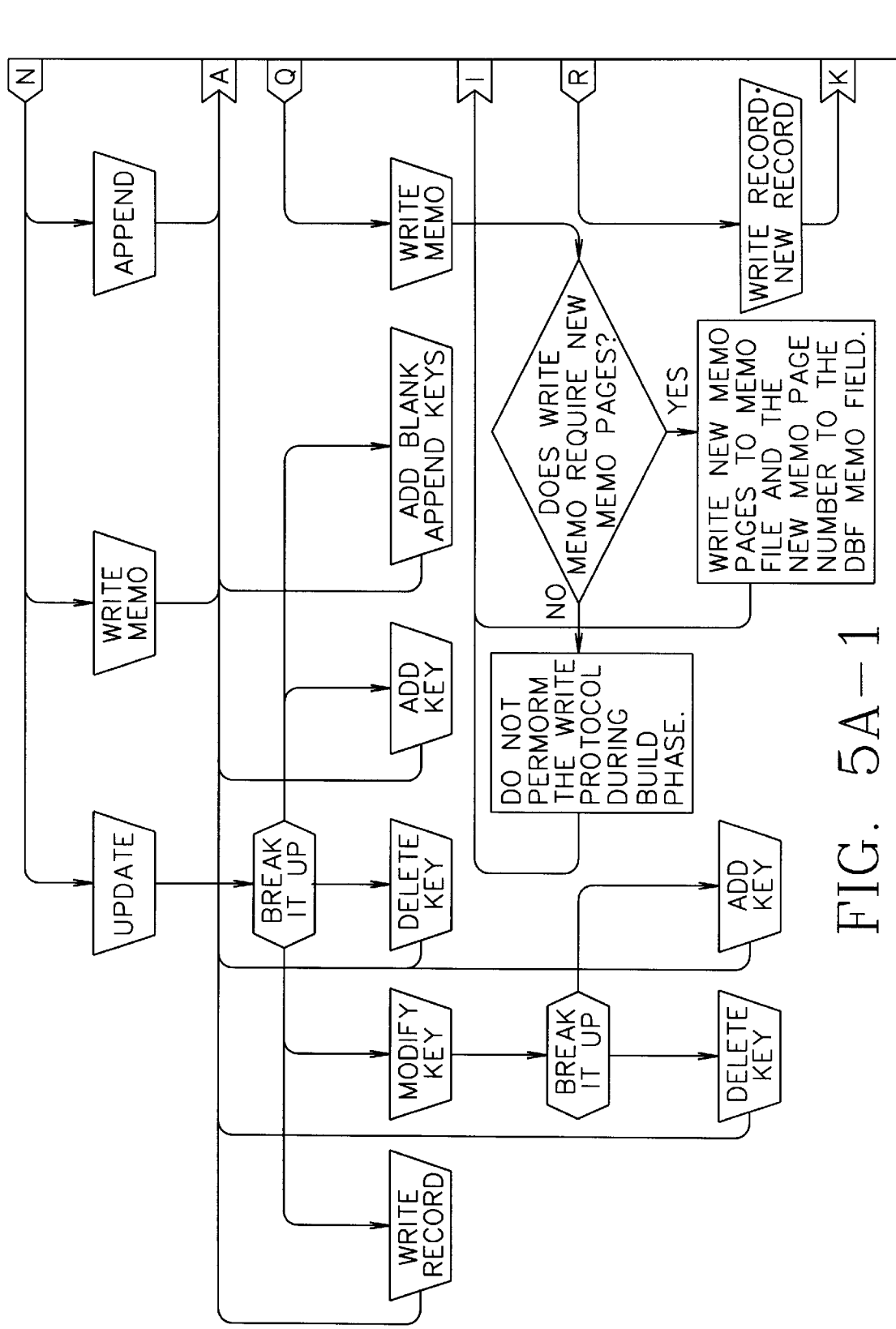
FIG. 5A and 5B are block diagrams showing how the Xbase transaction protocol interpreter of the preferred invention processes commands and presents the results to the Xbase transaction management means.
Figures 2, 5A:
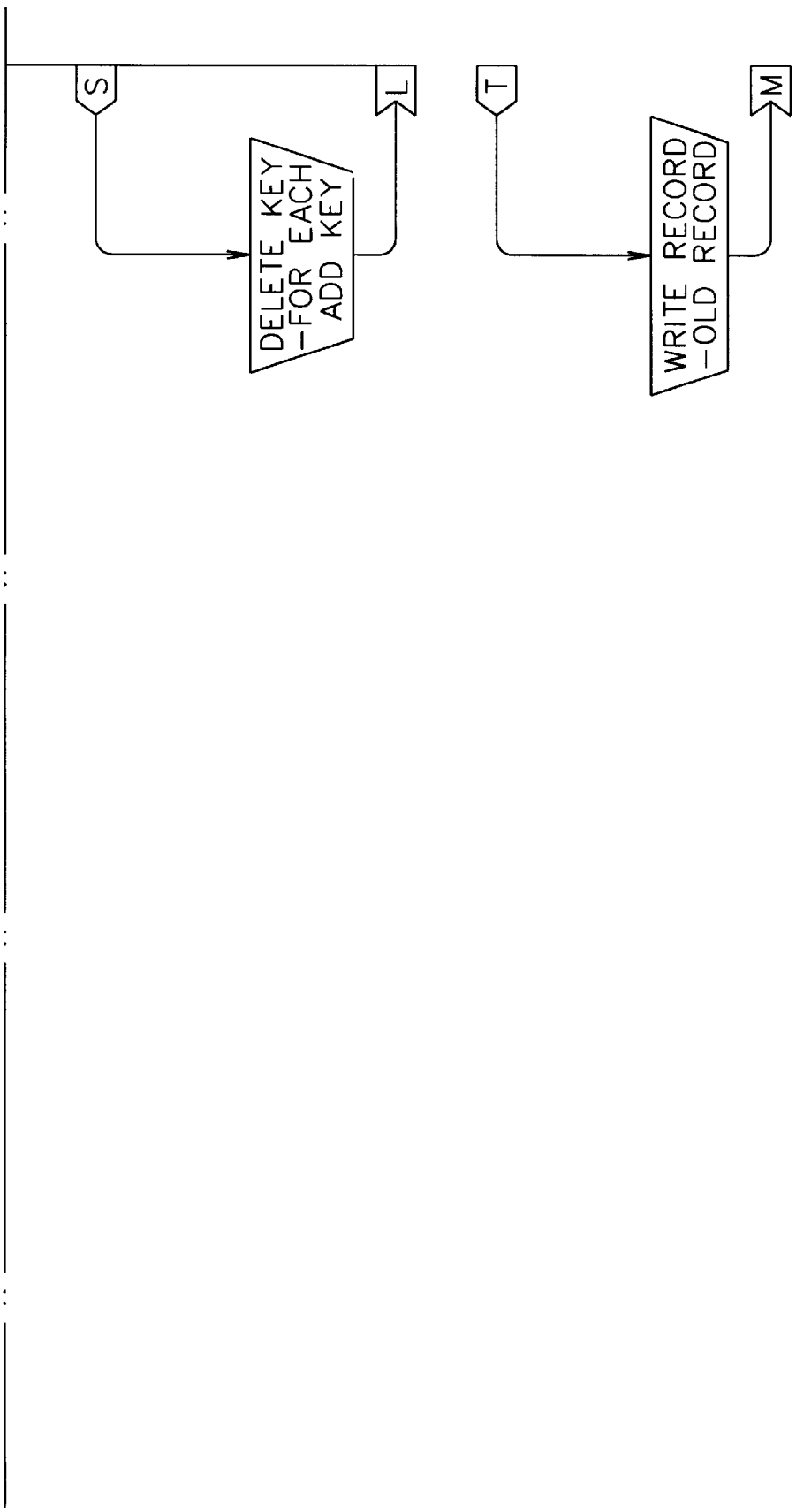
Figures 2, 5B:
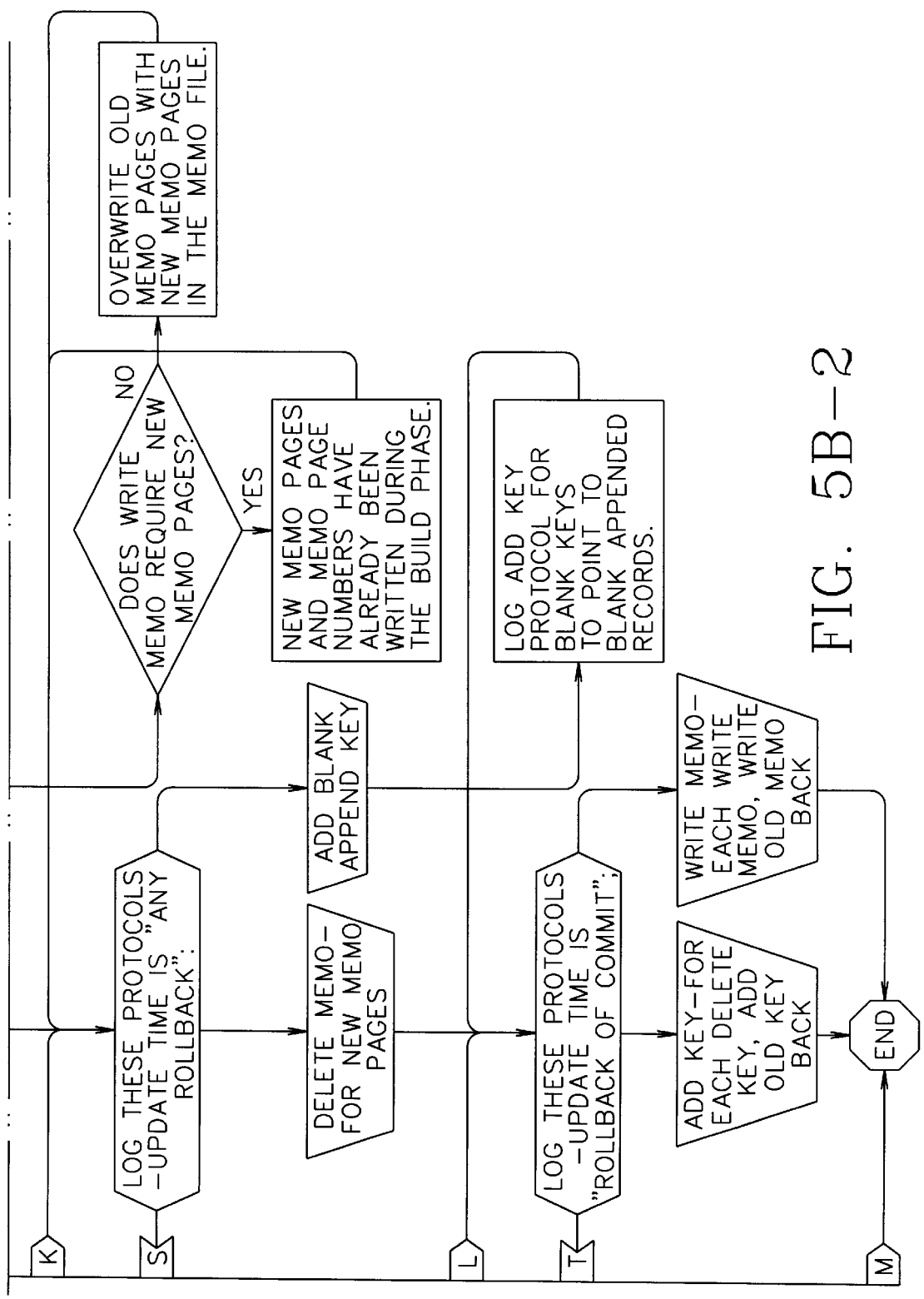
Figure 6A:
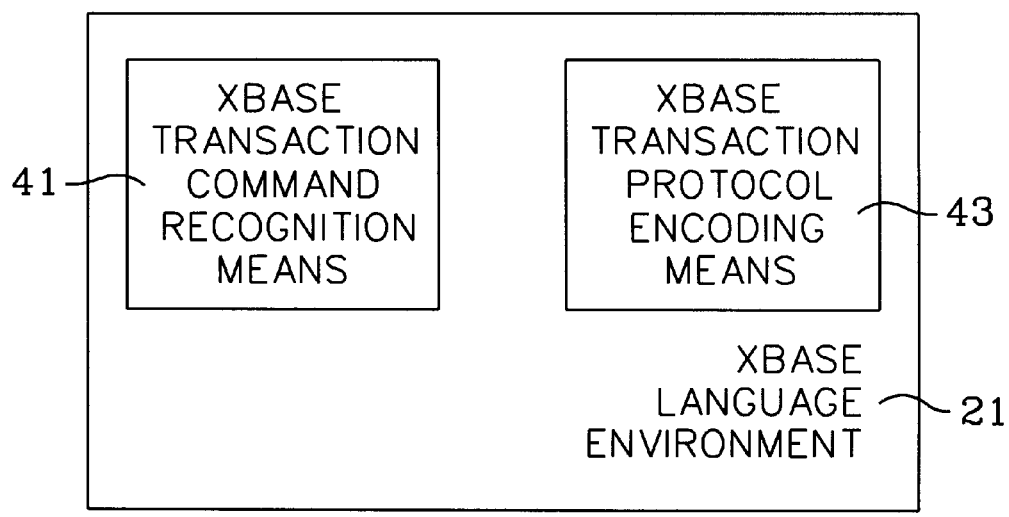
FIG. 6A is a expanded block diagram of the Xbase language environment an Xbase transaction processing system according to the present invention.
Figure 6B:
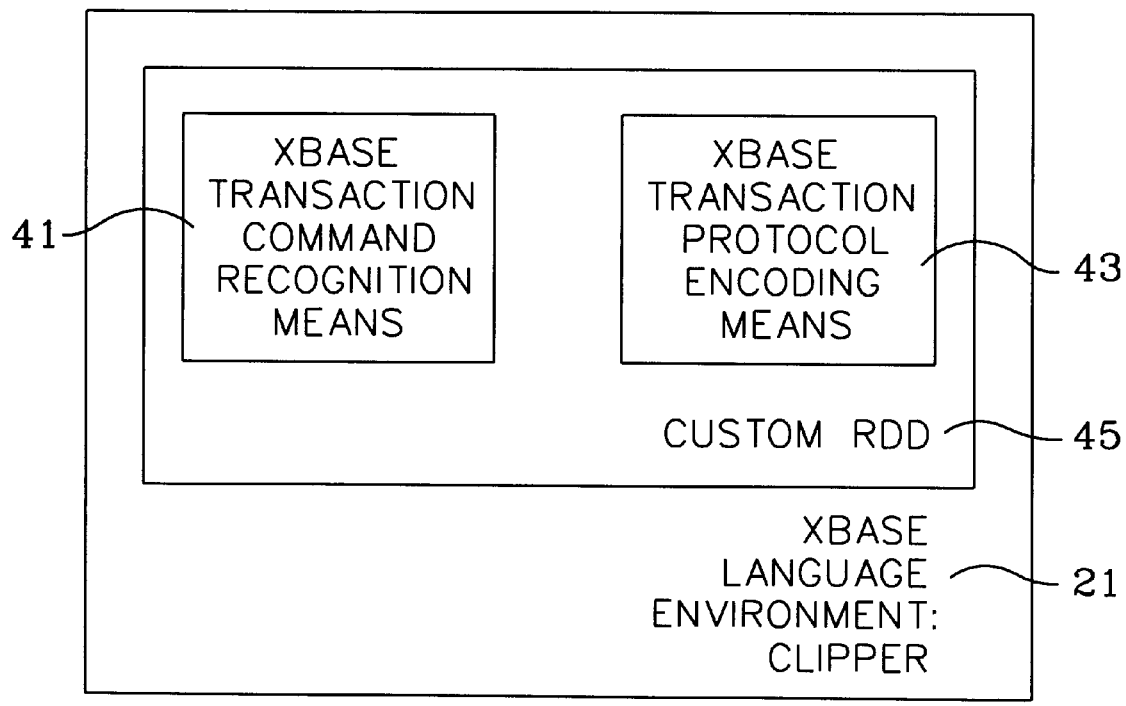
FIG. 6B is a expanded block diagram of the Xbase language environment of a preferred embodiment of an Xbase transaction processing system according to the present invention where the application programming environment is based on the Clipper programming language[9].

The preferred embodiment uses known technology specific to the Clipper environment including removable device drivers or RDDs [10]. In the preferred embodiment, the Xbase transaction command recognition means 41 of FIG. 6B uses an enhanced Clipper header file to provide a command interface for the BEGIN TRANSACTION, COMMIT TRANSACTION, and ROLLBACK TRANSACTION statements; Clipper translates those commands into function calls, and the function calls for BEGIN TRANSACTION, COMMIT TRANSACTION, and ROLLBACK TRANSACTION are passed directly to the client network means 23 of FIG. 4. The Xbase commands that actually change the data are processed by Clipper, and presented to the RDD 45 in functional form. The Xbase transaction protocol means 43 of the preferred embodiment of FIG. 6B is implemented collectively in the RDD function for each transaction related command. Each RDD function encodes the command using a simple protocol that is understood by the Xbase transaction protocol interpreter 29 using well known programming techniques. The preferred embodiment encodes Xbase transactional commands into a simple Xbase transaction protocol where the first byte is a unique operation code used to identify the encoded transactional command. The transactional commands in the preferred embodiment are update, write memo, append, delete key, add key, add blank append key, modify key, and write record. FIGS. 5A and 5B show the operation of the Xbase transaction protocol interpreter 29 for the preferred embodiment, and show how the protocol is interpreted and presented to the Xbase transaction management means 31. Note that for transaction identification and management, only commands that involve changing the data set are involved; commands that only read the database do not effect the transaction processing since they do not change the database.

In the preferred embodiment, the Xbase transaction management means 31 is implemented as a log file for each client 25 or 25'. As Xbase commands that will change the underlying Xbase file set 5 are received, they are stored in a unique log file on the server 18. The changes are not made and reflected to the actual Xbase file set 5 until a commit op code is received. If a rollback is received instead of a commit, the transaction log is simply discarded, and the Xbase files remain undisturbed by the rolled back transaction. When a commit is issued, the preferred embodiment uses the NetWare file I/O system as its data file execution means 33 to actually commit the changes to the Xbase file set 5 on the file server 18. If a read of data occurs against data in the transaction log, the preferred embodiment will return the data image in the log file, thus allowing only this client to view uncommitted data. Other clients reading the same area will see the data as it was at the start of the transaction. Thus other clients will either see the effects of the transaction in its entirety or not see it at all.

The preferred embodiment can be run in either transaction mode or non transaction mode; the latter mode is for Xbase application that depend on the historical, non-transaction oriented behavior of traditional Xbase. In the preferred embodiment, the application program 1 contains an explicit BEGIN TRANSACTION statement that is transmitted to the Xbase server as a specific operation code and puts the server in transaction mode for all work areas of a particular client. Transactions can terminate with the explicit language statements COMMIT TRANSACTION or ROLLBACK TRANSACTION. In addition, an important method of terminating a transaction is the case where any client computer 25 or 25' is turned off or fails for any reason. The server 18, through its server protocol can detect the failure of a client from a number of different ways. Novell NetWare, the networking environment of the preferred embodiment, detects through watch dog timers when any client 25 or 25' has gone away. The preferred embodiment exploits this NetWare feature to identify failed clients 25 or 25' and issue a rollback on behalf of the failed client 25 or 25'. This embodiment also has its own watchdog timers that can detect client failures that occur when the network connection itself is maintained. In any case where the server 18 determines the client has failed, the server issues its own rollback to undo any partial transaction in progress for the failed client 25 or 25, thus preserving database integrity.

In the preferred embodiment of FIG. 4, the client network communication means 23 mirrors that of the server network communication means 27; the network means 23 and 27 must be designed so that they can communicate with each other. The client network communication means 23 of the preferred embodiment also uses IPX for a network level protocol, and either SPX or a faster custom transport protocol tailored to Xbase. The preferred embodiment is designed for Clipper application programs but because its inherent client server architecture can accept Xbase commands from any client 25 or 25' who adheres to the server protocol. In the preferred embodiment, the application program 1 or 1' is a Clipper program. The Xbase language environment 21 is the Clipper programming environment [9] with a custom RDD [10] that can recognize and encode transaction related Clipper commands and functions. In the preferred environment, the application program 1 and the Xbase language environment 21 and the client network communication means 23 are statically linked to form a DOS EXE executable file. RDD technology is old and is described in [10]. The transaction-related commands in the preferred environment correspond to the server protocol operation codes for transaction oriented functions, namely, update, write memo, append, delete key, add key, add blank append key, modify key, and write record as well as begin and end transaction commands, illustrated by FIGS. 5A and 5B. The RDD then packages the command into the proper format for network communication and delivers the command to the client network communication means 23. The client network communication means 23 sends the command to the server 18 using convention networking technology through the server network communication means 27.

Another embodiment uses Microsoft NT as its server environment 18; alternate embodiments use different client application environments for the Xbase language environment 21 including Microsoft ODBC applications, CA Visual Objects, Borland's Delphi, and the Microsoft Visual toolkit.

Figure 7:
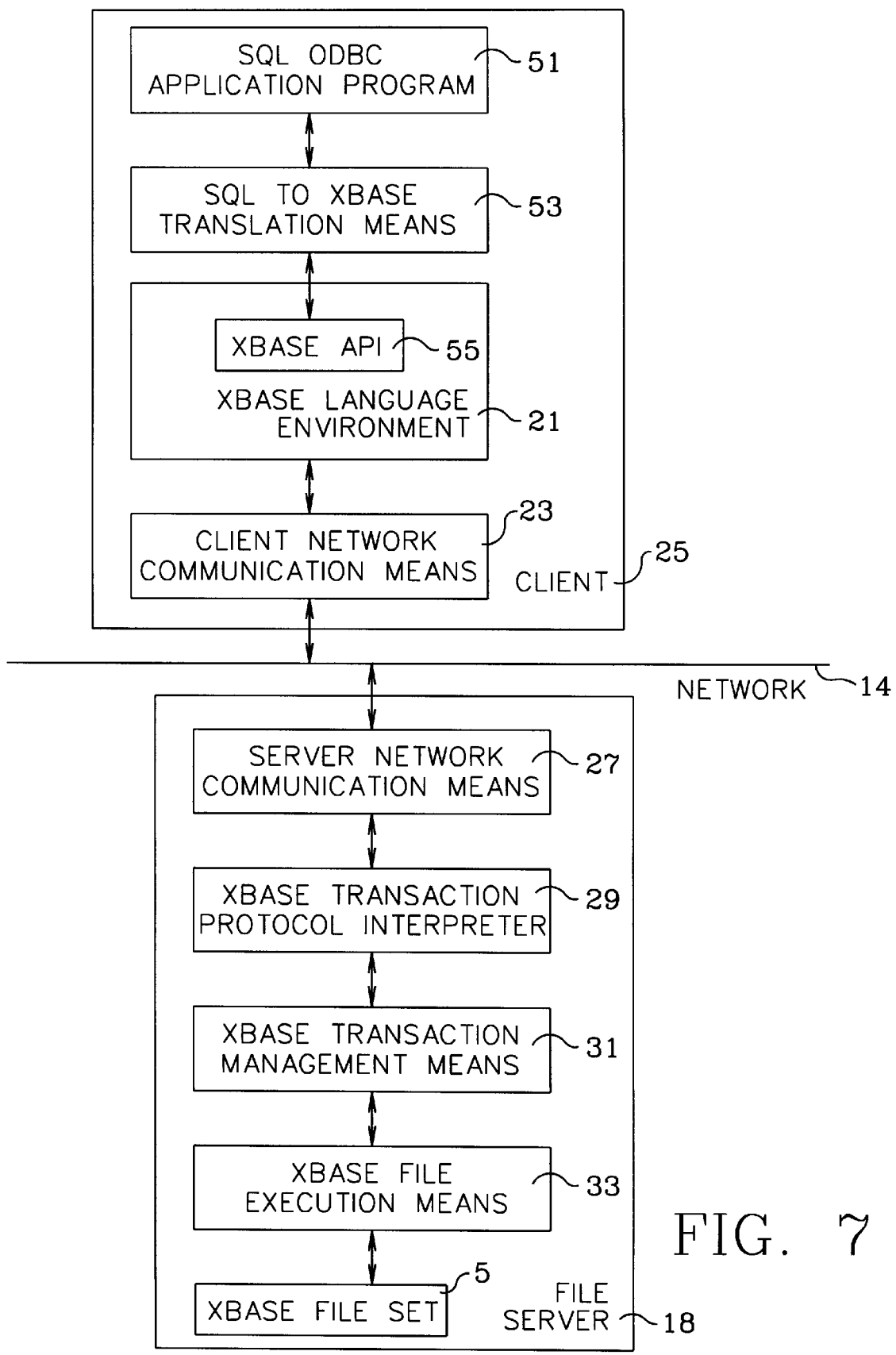
FIG. 7 is a block diagram of an Xbase transaction processing system supporting an SQL client executing against an Xbase file set with proper commit/rollback behavior according to the present invention.

Another embodiment is shown in FIG. 7. In this embodiment, ODBC technology is used to accept an SQL program 51 written for the Microsoft ODBC environment [11]. The SQL to Xbase translation means 53 is accomplished through any one of a number of well known parsing techniques [12]; the results are then treated as an Xbase language environment 21 for the present invention. In ODBC without the benefit of this invention, the commit/rollback logic is either not implemented or implemented improperly as discussed earlier in client-based transaction management systems. This invention teaches for the first time the way to achieve SQL commit/rollback transaction against an Xbase file set 5.

Figure 8:
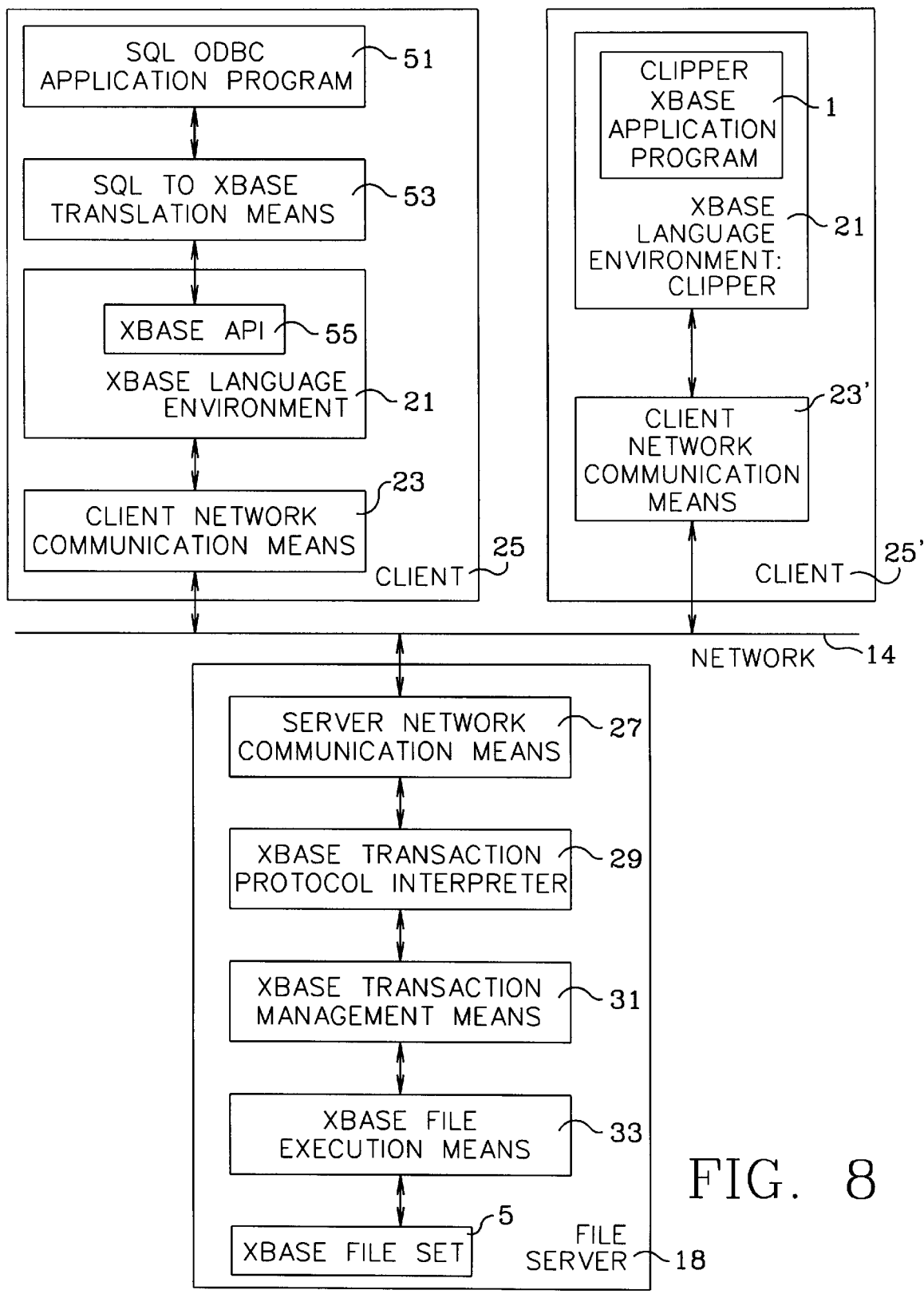
FIG. 8 is a block diagram of an Xbase transaction processing system supporting both SQL and Xbase simultaneous clients according to the present invention.

FIG. 8 shows another novel feature of the present invention. SQL client application programs 51 and Xbase application programs 5 can simultaneously operate against Xbase data sets 5 for the first time, each enjoying commit/rollback transactional behavior.

From the foregoing it will be appreciated that although specific embodiments of the invention have been described for purposes of illustration, variation modification may be made without deviating from the spirit and scope of the invention. In particular, applying this invention to different Xbase clients with variation in the Xbase language supported, different operating systems and computing environments for either the client and server, multiprocessor or multicomputing environment for the processor or the server and different computer architectures and variation in networking technology are within the spirit and scope of this invention. Accordingly, the invention is limited only by the appended claims.

We claim:

1. An Xbase transaction processing system for interpreting Xbase transactional commands encoded in an Xbase transaction protocol and enforcing commit/rollback transaction behavior on an Xbase file set on a server computer system attached to a network comprising:

a server network communication means, an Xbase transaction protocol interpreter, an Xbase transaction management means, and an Xbase data file execution means, the server network communication means is configured to receive Xbase transactional commands from the network and to present server responses to the network, the server network communication means is attached to the Xbase transaction protocol interpreter by a software interface means, the Xbase transaction protocol is attached to the Xbase transaction management means by a software interface means, and the Xbase transaction management means is attached to the Xbase data file execution means by a software interface means, whereby Xbase transactional commands encoded in the Xbase transaction protocol are received by the server network communication means, and are presented to the Xbase transaction protocol interpreter, which causes the Xbase transaction management means to maintain a list of candidate Xbase data file changes associated with a transaction to be maintained, which at the end of the transaction either causes a commit to occur whereby all the candidate changes identified by the list are committed to the Xbase file set by causing the Xbase data file execution means to make the specified changes to the Xbase file set or causes a rollback to occur whereby none of the changes identified by the candidate list are executed against the Xbase file set.

2. An Xbase client software system for encoding Xbase transactional commands in the Xbase transaction protocol on a client computer comprising:

one or more Xbase application programs, an Xbase language environment, and a client network communication means, the Xbase language environment further comprising:
an Xbase transaction command recognition means and
an Xbase transaction protocol encoding means, each application program is attached to the Xbase language environment by a software interface means, the Xbase language environment is attached to the client network communication means by a software interface means, whereby the Xbase language environment uses the Xbase command recognition means to identify Xbase transactional commands and uses the Xbase transaction protocol encoding means to encode transactional commands in the Xbase transaction protocol and present encoded Xbase transaction commands to the client network communication means, whereby the client network communication means presents the encoded command to the network.

3. The Xbase transaction processing system of claim 1 further comprising:

at least one Xbase client software means for encoding Xbase transactional commands in the Xbase transaction protocol on a client computer comprising:
one or more Xbase application programs,
an Xbase language environment, and
a client network communication means,
the Xbase language environment further comprising:
an Xbase transaction command recognition means and
an Xbase transaction protocol encoding means,
each application program is attached to the Xbase language environment by a software interface means,
the Xbase language environment is attached to the client network communication means by a software interface means,
whereby the Xbase language environment uses the Xbase command recognition means to identify Xbase transactional commands and uses the Xbase transaction protocol encoding means to encode transactional commands in the Xbase transaction protocol and present encoded Xbase transaction commands to the client network communication means, whereby the client network communication means presents the encoded command to the network whereby the transaction commit/rollback logic specified by each application program on the client is correctly applied to the Xbase file set on the server.

4. The Xbase transaction processing system of claim 3 further comprising an SQL to Xbase translation means, the translation means is attached to the Xbase language environment by a software interface means, whereby SQL client application programs can operate against the Xbase file set with proper commit/rollback behavior.

5. The Xbase transaction processing system of claim 3 wherein the server computer system operates Novell NetWare, and the server network communication means is based on IPX networking protocol.

6. The Xbase transaction processing system of claim 3 wherein the server computer system operates Novell NetWare, the server network communication means is based on the IPX networking protocol, and the Xbase Language environment is Clipper.

7. The Xbase transaction processing system of claim 3 wherein the server computer system operates Novell NetWare, the server network communication means is based on the IPX networking protocol, and the Xbase Language environment is Delphi.

8. The Xbase transaction processing system of claim 3 wherein the server computer system operates Microsoft Windows NT, and the Xbase Language environment is Microsoft Access.

* * * * *